United States Patent Office 3,071,600
Patented Jan. 1, 1963

3,071,600
3-OXATRICYCLO [3.2.1.0²,⁴] OCTANE-6,7-DIOL
Samuel W. Tinsley, South Charleston, W. Va., assignor to Union Carbide Corporation, a corporation of New York
No Drawing. Filed May 31, 1960, Ser. No. 32,522
1 Claim. (Cl. 260—348)

This invention relates to new epoxides which are derivatives of 3-oxatricyclo[3.2.1.0²,⁴]octane and to the process of preparing said compounds. More particularly, this invention is directed to 3-oxatricyclo[3.2.1.0²,⁴]octane-6,7-diol and to the cyclic carbonate of 3-oxatricyclo-[3.2.1.0²,⁴]octane-6,7-diol.

The compounds to which this invention is directed may be represented by the following formulae:

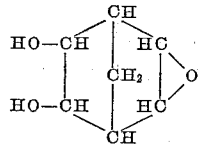

3-oxatricyclo[3.2.1.0²,⁴]octane-6,7-diol

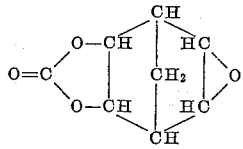

The cyclic carbonate of 3-oxatricyclo[3.2.1.0²,⁴]octane-6,7-diol.

Due to the presence of the epoxy group,

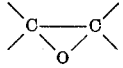

the novel compounds of this invention possess useful solvent properties. For example, they are compatible with many vinyl chloride and vinylidene chloride resins. Accordingly, the compounds of this invention can be used as plasticizers for these and other resins. By incorporating into the resin from about 5 to 50 percent by weight of these novel epoxides, a plasticized product is obtained which possesses useful resilient and flexible characteristics. The vinyl halide resins which can be satisfactorily plasticized by the compounds of this invention can be any vinyl halide polymer such as poly(vinyl chloride), vinyl chloride-vinyl acetate copolymers, vinyl chloride-acrylonitrile copolymers, vinyl chloride-vinylidene chloride copolymers, vinyl chloride-vinylidene chloride-acrylonitrile copolymers and the like. The compounds of this invention may be used alone or in conjunction with conventional plasticizers. In addition to their use as plasticizers, the compounds of this invention can be employed as stabilizers for chlorine-containing resins where they are effective even at low concentrations. The compounds are also useful in the preparation of synthetic lubricants, tanning agents and biological preparations.

The starting materials, bicyclo[2.2.1]hept-2-ene-5,6-diol and the cyclic carbonate of bicyclo[2.2.1]hept-2-ene-5,6-diol were prepared according to the procedure described in J. Am. Chem. Soc., 77, 3789 (1955). The unsaturated starting materials were then epoxidized to 3-oxatricyclo-[3.2.1.0²,⁴]octane-6,7-diol and the cyclic carbonate of 3-oxatricyclo[3.2.1.0²,⁴]octane-6,7-diol by use of peracids such as peracetic acid, perbenzoic acid, monoperphthalic acid, performic acid, hydroperoxides and the like. The preferred form of the use of peracids in the process of this invention is in an inert diluent such as ethyl acetate because of the ease of handling and the avoidance of hazards caused by the crystallization of the peroxide from solution. Other diluents which are non-reactive with the peroxide, may be employed and include among others, acetone, methyl ethyl ketone and butyl acetate. Peracetic acid is particularly well-suited for the epoxidation of olefinic linkages since this epoxidation reaction can be carried out under relative mild conditions and with a minimum of operating difficulty. For these reasons the use of peracetic acid is more desirable for commercial application.

The epoxidation of the unsaturated starting materials is carried out at temperatures in the range of from —25° C. to 150° C. At the lower temperatures, the rate of epoxidation is slow while at the higher temperatures the rate is faster necessitating precautions to prevent further reaction of the epoxide groups. In order to avoid undesired side reactions and to provide a suitable reaction rate, temperatures in the range of from 10° C. to 90° C. are preferable. In the practice of the invention, the unsaturated starting material is conveniently charged to a reaction vessel and the appropriate quantity of peracid such as peracetic acid is added. The mol ratio is not necessarily critical but a mol to mol ratio of peracid to starting material is preferred. The reaction is allowed to proceed for a time sufficient to consume approximately the theoretical quantity of peracid needed to effect epoxidation. The amount of peracid consumed can be determined by periodic tests for peracid. Usually from about one to about ten hours is sufficient for the reaction to be completed at the preferred temperature. It is preferred, although not absolutely necessary, to separate the by-product acid such as acetic acid from the epoxide rapidly, since the by-product acid will react with the epoxide to form undesired products, decreasing the overall yield. Finally the reaction mixture is subjected to conventional recovery procedures to isolate the reaction product. Extraction with a suitable solvent, continuous distillation, distillation under reduced pressure or crystallization, all are applicable to the recovery of the epoxide product.

The extent of epoxidation can easily be followed by subjecting the reaction mixture to an analysis for unreacted epoxidant. The analysis for determining epoxidant, that is, peracetic acid content, can be performed, for example, by introducing one to 1.5 grams of a sample of unknown epoxidant concentration into a flask containing a mixture of 60 milliliters of glacial acetic acid and five milliliters of a saturated potassium iodide solution. The flask is swirled to mix the solutions and then titrated immediately with a 0.1 N aqueous sodium thiosulfate solution to a colorless endpoint. From the titration data thus obtained, a determination of epoxidant content can be made.

The following examples will serve to illustrate the practice of the invention:

EXAMPLE I

*Preparation of the Cyclic Carbonate of 3-Oxatricyclo-[3.2.1.0²,⁴]Octane-6,7-Diol*

The cyclic carbonate of bicyclo[2.2.1]hept-2-ene-5,6-diol was prepared according to J. Am. Chem. Soc., 77, 3789 (1955).

To a solution of 100 grams of the cyclic carbonate of bicyclo[2.2.1]hept-2-ene-5,6-diol in 50 grams of ethyl acetate which was maintained, with stirring, at 40–45° C. by means of an ice-water bath, there was added over a period of 45 minutes 243 grams of a 24.7 percent solution of peracetic acid in ethyl acetate. After an additional 6 hours at 40–45° C., crystals began to separate from the solution. The solution was cooled and filtered to give 55 grams of the cyclic carbonate of 3-oxatricyclo[3.2.1.0²,⁴]octane-6, 7-diol, melting point 140–165° C. The analytical sample, after recrystallization from acetone-heptane, had a melting point range of 178–180° C.

Analysis:

|  | C, percent | H, percent |
|---|---|---|
| Calculated for $C_8H_8O_4$ | 57.20 | 4.76 |
| Found | 57.66 | 5.07 |

EXAMPLE II

*Preparation of 3-Oxatricyclo[3.2.1.0$^{2,4}$]Octane-6,7-Diol*

The unsaturated precursor, bicyclo[2.2.1]hept-2-ene-5,6-diol, was prepared by hydrolysis of its cyclic carbonate as described in J. Am. Chem. Soc., 77, 3789 (1955).

To a solution of 25 grams of bicyclo[2.2.1]hept-2-ene-5,6-diol in 20 grams of ethyl acetate which was maintained, with stirring at 55–60° C. by means of an ice-water bath there was added dropwise over a period of 15 minutes 75 grams of a 24.6 percent solution of peracetic acid in ethyl acetate. After an additional hour and half at 55–60° C., the reaction was complete as shown by a titration for peracetic acid. The solution was cooled and filtered to give 11 grams of 3-oxatricyclo[3.2.1.0$^{2,4}$]octane-6,7-diol, melting point 185–190° C. Evaporation of the filtrate give an additional 13 grams of crude product.

Analysis:

|  | C, percent | H, percent |
|---|---|---|
| Calculated for $C_7H_{10}O_3$ | 59.14 | 7.09 |
| Found | 59.28 | 7.23 |

What is claimed is:
3-oxatricyclo[3.2.1.0$^{2,4}$]octane-6,7,diol.

References Cited in the file of this patent

UNITED STATES PATENTS

| 2,730,531 | Payne et al. | Jan. 10, 1956 |
| 2,799,567 | Johnson et al. | July 16, 1957 |
| 2,841,485 | Johnson et al. | July 1, 1958 |

OTHER REFERENCES

Kwart et al.: J. Am. Chem. Soc., vol. 76, pages 5400–3 (1954).

Newman et al.: J. Am. Chem. Soc., vol. 77, page 3789 (1955).